United States Patent
Yasugi et al.

(10) Patent No.: US 8,247,917 B2
(45) Date of Patent: Aug. 21, 2012

(54) STORAGE BATTERY OUTPUT POWER CONTROL METHOD FOR WIND TURBINE GENERATOR

(75) Inventors: Akira Yasugi, Tokyo (JP); Masaaki Minami, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/015,823

(22) Filed: Jan. 28, 2011

(65) Prior Publication Data
US 2012/0061959 A1 Mar. 15, 2012

Related U.S. Application Data (63) Continuation of application No. PCT/JP2010/071061, filed on Nov. 25, 2010.

(51) Int. Cl.
*H02P 9/04* (2006.01)
(52) U.S. Cl. ............................................................. 290/44
(58) Field of Classification Search ..................... 290/44
See application file for complete search history.

(56) References Cited

U.S. PATENT DOCUMENTS

| | | | |
|---|---|---|---|
| 6,563,234 B2* | 5/2003 | Hasegawa et al. | 307/66 |
| 6,924,627 B1* | 8/2005 | Wobben | 322/20 |
| 7,353,083 B2* | 4/2008 | Hennessy | 700/286 |
| 2001/0012211 A1 | 8/2001 | Hasegawa et al. | |
| 2003/0015876 A1* | 1/2003 | Ichinose et al. | 290/44 |
| 2005/0127680 A1* | 6/2005 | Lof et al. | 290/44 |
| 2005/0156432 A1* | 7/2005 | Hennessy | 290/44 |
| 2008/0224541 A1 | 9/2008 | Fukuhara | |
| 2009/0167088 A1 | 7/2009 | Llorente Gonzales et al. | |
| 2011/0074151 A1* | 3/2011 | Burra et al. | 290/44 |

FOREIGN PATENT DOCUMENTS

| | | |
|---|---|---|
| EP | 1122856 A2 | 8/2001 |
| EP | 2001098 A2 | 12/2008 |
| JP | 3352662 B2 | 12/2002 |
| JP | 2003-158825 A | 5/2003 |
| JP | 2008-236821 A | 10/2008 |

OTHER PUBLICATIONS

International Search Report issued in corresponding application No. PCT/JP2010/071061 on Feb. 22, 2011.

* cited by examiner

*Primary Examiner* — Tulsidas C Patel
*Assistant Examiner* — Stefan Mikailoff
(74) *Attorney, Agent, or Firm* — Kanesaka Berner & Partners, LLP

(57) ABSTRACT

A control method for a wind turbine generator and storage battery unit connected to a power grid in parallel, includes calculating total active power and total reactive power, and switching between: a first mode in which the generator outputs turbine required active power and reactive power that can be outputted by the generator and the battery unit outputs battery required active power and battery required reactive power which correspond to a difference between the total active power and the turbine required active power and a difference between the total reactive power and the turbine required reactive power respectively; and a second mode in which the battery required active power is maintained and the battery required reactive power is reduced while the turbine reactive power is increased by an amount of the reduction of the battery required reactive power wherein apparent power exceeds a set battery unit apparent power.

6 Claims, 4 Drawing Sheets

STORAGE BATTERY OUTPUT POWER CONTROL METHOD FOR WIND TURBINE GENERATOR

RELATED APPLICATIONS

The present application is a continuation of International Application Number PCT/JP2010/071061, filed Nov. 25, 2010, the disclosure of which is hereby incorporated by reference herein in its entirety.

TECHNICAL FIELD

The present invention relates to an output control method and an output control unit for a wind power plant having an electric storage device installed with a wind turbine generator, and particularly an output control method and an output control device for a wind turbine generator, which is capable of suppressing frequency fluctuation or voltage fluctuation of a grid due to a system disturbance.

BACKGROUND

A wind power plant in which a wind turbine generator is installed with a storage battery unit has been well known.

Figure 5:
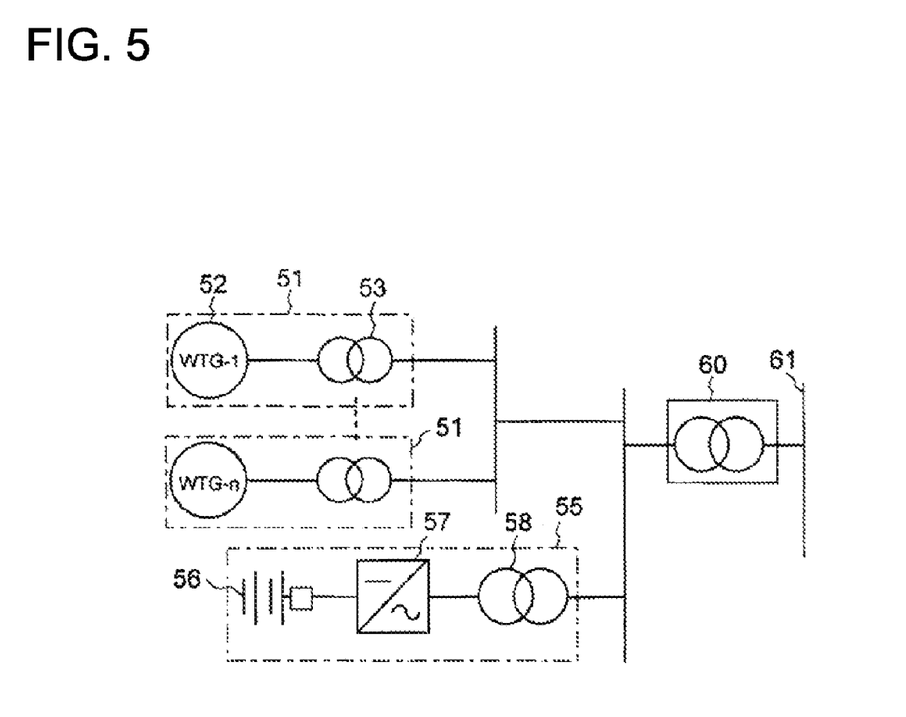
FIG. 5 A general structure of a conventional wind turbine generator.

FIG. 5 shows a configuration of the wind power plant. The wind power plant includes a plurality of wind turbine generators 51 at a wind farm, a storage battery unit 55 arranged in parallel with the wind turbine generators, and a grid 61 connected to the wind turbine generators 51 and the storage battery unit 55 via a grid interconnection part 60. Herein, the grid 61 refers to a commercial grid for supplying electric power to houses and so on. In general, the wind turbine generator 51 is configured such that a rotation of a wind turbine blade is inputted to an asynchronous generator 52 via a gear box to generate electric power, and the electric power generated in the asynchronous generator 52 is transformed in an electric transformer 53 and thus inputted to the grid 61 via the grid interconnection part 60.

However, in the wind turbine generator 51, the wind power energy changes in response to change in wind speed, thereby possibly affecting a supply-demand balance and frequency of the grid 61. It is sought to maintain a voltage and a frequency of the electric power supplied to the grid within an allowable range of the total active power and the total reactive power. In the conventional system, the storage battery unit 55 compensates for the shortfall of the electric power beyond the capacity of the wind turbine generator in response to active power and reactive power requested on a grid side. In the storage battery unit 55, a DC-AC converter 57 converts a direct current from a storage battery unit 56 to an alternative current output and then, the converter 58 transforms the converted alternative current via the grid interconnection part and supplies to the grid 61 via the grid interconnection part 60. In this manner, the storage battery unit installed with the wind turbine generator 51 mainly functions to smooth out the output fluctuation of the wind turbine generator 51.

Meanwhile, grid accidents such as lightening strike can generate disturbance in voltage and frequency on the grid side. Conventionally, in the event of such accidents, the wind power plant was disconnected. However, in recent years, it is sought to continue the operation of the wind power plant and restart a steady operation thereof immediately after recovery of the grid without disconnecting the wind power plant from the grid. In addition to this, a new system is studied, in which outputs of active power and reactive power of the wind power plant are simultaneously controlled for the purpose of stabilizing the grid.

For instance, PATENT DOCUMENT 1 (JP 3352662 B) discloses a device to stabilize a grid in the event of grid disturbance. The device includes a first unit for outputting electric power to a grid such as a wind power generator and solar power generator, and a secondary battery system including a battery which is provided with a consideration of over-discharging and charging above a rated value. Further, differences between a setting value of the active power, a setting value of the reactive power, a reference frequency and a reference voltage, and current values thereof are detected. In accordance to the detected references, the active power amount and the reactive power amount outputted from the storage battery unit are controlled based on overloading output and continuation time characteristics.

RELATED ART DOCUMENT

Patent Document

[PATENT DOCUMENT 1] JP 3352662 B

SUMMARY

As described above, it is demanded in the wind power plant to suppress the voltage fluctuation and the frequency fluctuation of the grid during the grid disturbance. It is possible to reduce the voltage fluctuation of the grid by controlling the reactive power supplied from the wind power plant and also possible to reduce the frequency fluctuation of the grid by controlling the active power. In this case, the output of the wind turbine generator depends on the wind speed as explained above and thus it is difficult to control the active power. In view of this issue, Patent Document 1 discloses that a storage battery unit compensates for active power which cannot be controlled by a wind turbine generator. The storage battery unit has an automatic frequency control function by means of a A-D converter and thus the active power required for reducing the frequency fluctuation of the grid can be supplied.

However, a second battery system disclosed in Patent Document 1 includes a second battery which is provided with a consideration of over-discharging and charging above a rated value consideration and generally, the storage battery provided in the storage battery unit switches to a overload operation once the storage battery exceeds a preset amount, resulting in shortening the life of the battery. The storage battery is expensive and costly to install and thus, there is a demand for an appropriate operation control thereof so as to avoid the overload operation.

Therefore, in view of the above issues, an object of the present invention is to provide an output control method and an output control unit for a wind power plant which is capable of suppressing voltage fluctuation and frequency fluctuation of the grid during a grid disturbance and controlling an optimal overall output of a wind turbine generator and a storage battery unit while preventing the overloading of the storage battery unit.

As an aspect of the present invention to solve the above issues, an output control method for a wind power plant in which a wind turbine generator and a storage battery unit are connected to a grid in parallel via a grid interconnection part, may include, but is not limited to, the steps of: calculating total active power and total reactive power to be supplied to the grid from the wind power plant based on voltage information and current information which are detected at a grid connecting end of the wind power plant, and switching an operation mode selectively between: a first operation mode in which the wind turbine generator outputs wind turbine required active power and wind turbine required reactive power which match an upper limit that can be outputted by the wind turbine generator and the storage battery unit outputs storage battery required active power and storage battery required reactive power which respectively correspond to a difference between the total active power and the wind turbine required active power and a difference between the total reactive power and the wind turbine required reactive power respectively within an allowable range of the total active power and the total reactive power; and a second operation mode in which the storage battery required active power is maintained and the storage battery required reactive power is reduced while the wind turbine reactive power is increased by an amount of the reduction of the storage battery required reactive power in such a case that apparent power based on the storage battery required active power and the storage battery required reactive power exceeds a setting apparent power of the storage battery unit in the first operation mode.

The total active power and the total reactive power herein respectively mean active power and reactive power required in the overall wind power plant to maintain the frequency and the voltage of the grid within the acceptable range. The total active power and the total reactive power are respectively distributed to the wind turbine generator and the storage battery unit according to the prescribed output distribution.

The wind turbine required active power and the wind turbine reactive power respectively are the active power and the reactive power required by the wind turbine generator out of the total active power and the total reactive power.

The storage battery required active power and the storage battery reactive power respectively are the active power and the reactive power required by the storage battery unit out of the total active power and the total reactive power.

In the aspect of the present invention, the first operation mode is applied principally in the steady state. In the first operation mode, the wind turbine required active power and the wind turbine required reactive power which are distributed to the wind turbine generator are set to maximum so as to match the upper limit which can be outputted by the wind turbine generator and thus, wind power energy which is renewable energy can be utilized effectively. The steady state herein refers to the state in which a setting apparent power based on the storage battery required active power and the storage battery required reactive power in the output distribution between the wind turbine generator and the storage battery unit in the first operation mode does not exceed the setting apparent power of the storage battery unit, that is the state in which the voltage fluctuation in the grid or the frequency fluctuation is smaller than those during the grid disturbance.

The second operation mode described above is principally set in time of grid disturbance by switching the operation mode from the first operation mode. In time of grid disturbance, at least one of the grid frequency and the grid voltage sometimes changes out of the acceptable range of the grid. Thus, the total active power to be supplied from the wind turbine generator is controlled to suppress the frequency fluctuation of the grid and the total reactive power is controlled to suppress the voltage fluctuation of the grid. In such a case that the apparent power based on the storage battery required active power and the storage battery required reactive power distributed to the storage battery in accordance with the control amount, exceeds the setting apparent power of the storage battery, the operation mode is switched to the second operation mode. In the second operation mode, even if the total active power and the total reactive power change significantly during the grid disturbance, the storage battery unit can be protected against overload. Further, the storage battery being capable of adjusting the active power freely outputs the active power preferentially and the wind turbine generator which being not capable of adjusting the active power but capable of adjusting the reactive power outputs the reactive power preferentially. Thus, the required apparent power which is required to prevent the disturbance can be outputted in an appropriate distribution amount.

The fluctuation in response to the small disturbance, which does not render the storage battery in the overload state, can be controlled in the first operation mode.

As described above, according to the present invention, it is possible to effectively utilize the renewable energy to maximum and control the optimum output distribution of the active power and the reactive power to prevent the storage battery from getting in the overload state.

It is preferable that that the operation mode is switched from the first operation mode to the second operation mode when required apparent power derived from output of the storage battery unit exceeds the setting apparent power of the storage battery unit which is set in advance, and in the second operation mode, the storage battery required reactive power is reduced till required apparent power derived from the storage battery required active power and the storage battery required reactive power becomes not greater than the setting apparent value.

As described above, the required apparent power is derived from the storage battery required active power and the storage battery required reactive power distributed to the storage battery unit and, in such a case that the require apparent power exceeds the setting apparent power, it is determined that the storage battery unit exceeds the setting capacity. By this, it is possible to easily determine that the storage battery unit exceeds its capacity from the storage battery required active power and the storage battery required reactive power.

It is also preferable that residual amount of the storage battery unit is detected and the setting apparent power is changed in accordance with the residual capacity. By this, not only during the grid disturbance, the active power and the reactive power can be distributed to the storage battery unit and the wind turbine generator respectively according to the residual amount of the storage battery unit in the second operation mode.

It is preferable that in the second operation mode, the required apparent power of the storage battery unit in an output distribution between the wind turbine generator and the storage battery unit in the first operation mode is monitored, and the operation mode is switched from the second operation mode to the first operation mode in such a case that the required apparent power becomes less than the setting apparent power.

Specifically, during the operation in the second operation mode, the required apparent power in the output distribution of the second operation mode is monitored and when the required apparent power becomes less than the setting apparent power, i.e. when the storage battery unit would not be in the overload state in the first operation mode as well, the operation mode is switched from the second operation mode to the first operation mode. By this, it is possible to always operate in the first operation mode as long as the storage battery unit does not become in the overload state and thus, wind power energy can be utilized to maximum.

Moreover, in an aspect of the present invention, an output control unit for a wind power plant in which a wind turbine generator and a storage battery unit are connected to a grid in parallel via a grid interconnection part, may include, but is not limited to: a master controller to which voltage information and current information of a grid connecting end of the wind turbine generator are inputted; a wind turbine generator controller which controls an output of the wind turbine generator based on an output command from the master controller; and a storage battery controller which controls an output of the storage battery unit based on the output command from the master controller, wherein the master controller includes a power calculation device which calculates total active power and total reactive power to be supplied to the grid from the wind turbine generator based on the voltage information and the current information, and an operation mode switching device which selective switches an operation mode between: a first operation mode in which the wind turbine generator outputs wind turbine required active power and wind turbine required reactive power which match an upper limit that can be outputted by the wind turbine generator and the storage battery unit outputs storage battery required active power and storage battery required reactive power which respectively correspond to a difference between the total active power and the wind turbine required active power and a difference between the total reactive power and the wind turbine required reactive power respectively within an allowable range of the total active power and the total reactive power; and a second operation mode in which the storage battery required active power is maintained and the storage battery required reactive power is reduced while the wind turbine reactive power is increased by an amount of the reduction of the storage battery required reactive power in such a case that apparent power based on the storage battery required active power and the storage battery required reactive power exceeds a setting apparent power of the storage battery unit in the first operation mode.

It is preferable that the output control unit for the wind power plant further includes: a state of charge which detects a residual amount of the storage battery unit, wherein the master controller changes the setting apparent power in accordance with the residual amount detected by the state of charge.

According to the invention as described above, the operation mode is selectively switched between the first operation mode which is set principally in the steady state of the grid and the second operation mode which is set principally in the grid disturbance. Thus, it is possible to effectively utilize wind power energy which is renewable energy to maximum and to control the optimum output distribution of the active power and the reactive power to prevent the storage battery from getting in the overload state.

DETAILED DESCRIPTION

A preferred embodiment of the present invention will now be described in detail with reference to the accompanying drawings.

It is intended, however, that unless particularly specified, dimensions, materials, shape, its relative positions and the like shall be interpreted as illustrative only and not limitative of the scope of the present.

Figure 1:
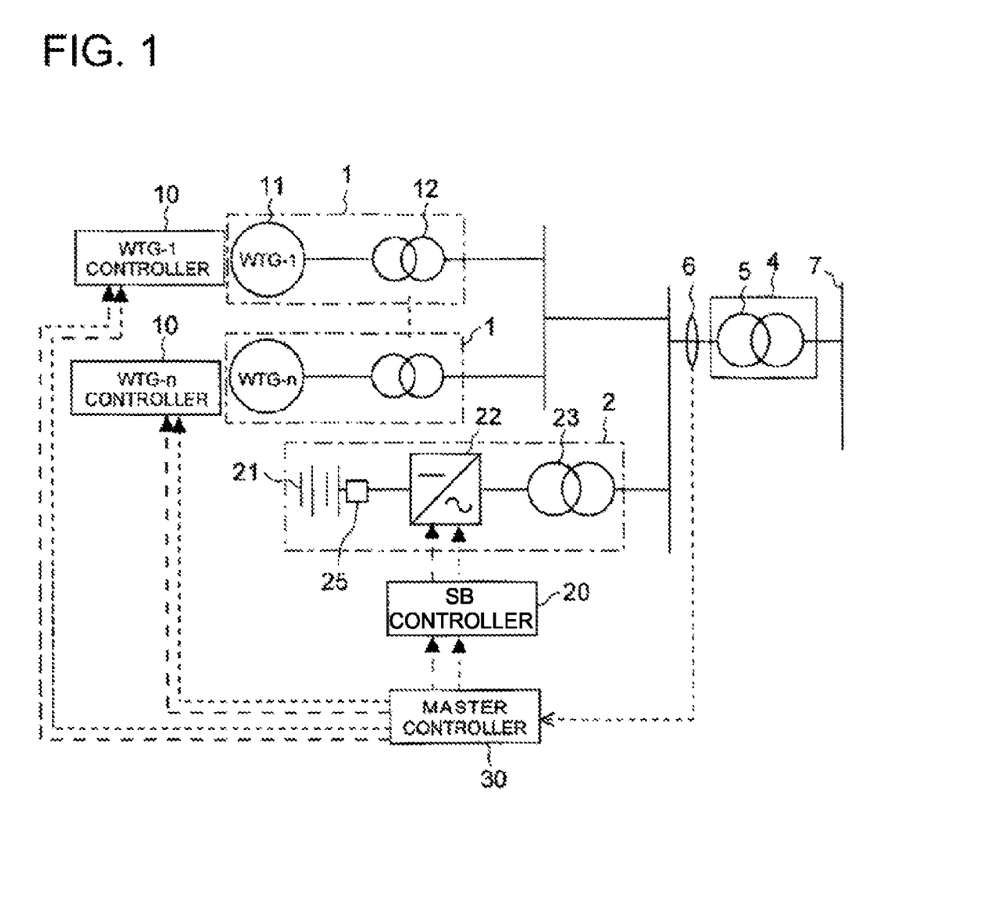
FIG. 1 A general structure of a wind power plant including an output control unit in relation to a preferred embodiment of the present invention.

First, a general structure of the wind power plant is explained in reference to FIG. 1.

The wind power plant includes a wind turbine generator 1 and a storage battery unit 2. The wind turbine generator 1 and the storage battery unit 2 are connected in parallel to a grid interconnection part 4.

At least one wind turbine generator 1 is provided. In the case of installing a plurality of wind turbine generators 1, the wind turbine generators 1 are respectively connected in parallel to the grid interconnection part 4. The wind turbine generator 1 includes a plurality of blades, and a rotor on which the blades are mounted. The rotor is connected to a generator 11 via a gearbox. A bus bar which is connected to an output terminal of the generator 11 is connected to a grid terminal 6 of the grid interconnection part 4 via a transformer 12. In the wind turbine generator 1, the rotation of the wind turbine blades is inputted to the generator 11 via the gearbox, and then the electric power generated in the generator 11 is supplied to the power grid 7 via the grid interconnection part 4 after being converted by the transformer 12.

At least one storage battery unit 2 should be provided. In the case of providing a plurality of storage battery units 2, the storage battery units 2 are respectively connected in parallel to the grid interconnection part 4. The storage battery unit 2 includes one or more storage batteries 21 connected in series, a DC-AC converter 22 for converting direct current to alternate current, and a transformer 23. A bus bar connected to an output terminal of the storage batteries 21 is connected to the grid terminal 6 of the grid interconnection part 4 via the transformer 23. In the storage battery unit 2, the DC-AC converter 22 converts the discharged DC output to AC output, the transformer 23 converts the AC output to a set voltage and then the converted AC output is supplied to the power grid 7 via the grid connection part 4. If needed, the storage battery unit 2 is charged by the power grid 7. In the charging process, power information and voltage information of the power grid 7 are inputted to a storage battery controller 20, which is described later. It is preferable to perform discharge-charge control based on the voltage information and the current information of the power grid 7.

Herein, the grid interconnection part 4 functions to interconnect the wind power plant with the power grid 7, and performs a variety of adjusting supply of the power based on the conditions between the power grid 7 and the wind power plant. For instance, as a condition of grid interconnection, the voltage fluctuation and the output value at the interconnection point is set to be within an acceptable range. Further, the grid interconnection part 4 may include a transformer 5.

Further, the power grid 7 refers to a group of system equipments to supply the output power generated in the power plant to utility consumers via a power line and a substation and herein refers to a commercial grid to supply the power to general consumers.

The generator system having the above structure includes an output control unit. The output control unit includes a wind turbine generator controller (WTG controller) 10 for controlling the output of the wind turbine generator 1, a storage battery controller (SB controller) 20 for controlling the output of the storage battery unit 2, and a master controller 30 for giving an active power signal and a reactive power signal to the wind turbine generator controller 10 and the storage battery controller 20 respectively.

Figure 2:
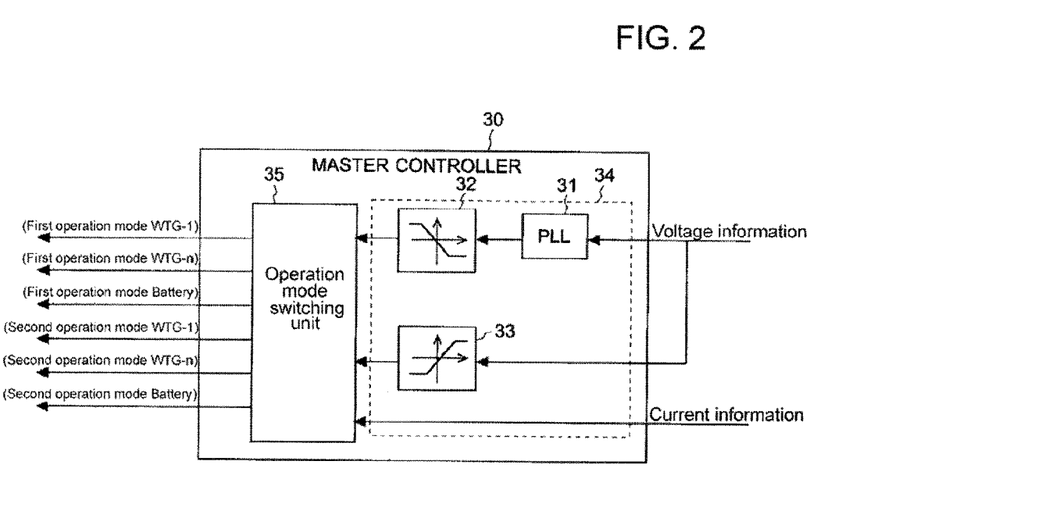
FIG. 2 A control diagram of a master controller of the preferred embodiment of the present invention.

Now, a control operation of the master controller 30 is explained in reference to FIG. 2. FIG. 2 is a control diagram of the master controller 30 of a preferred embodiment of the present invention.

The master controller 30 respectively distributes the total active power and the total reactive power to be supplied from the wind power plant to the power grid 7 to the wind turbine generator controller 10 and the storage battery controller 20 and sets wind turbine required active power and wind turbine required reactive power to the wind turbine generator 1 and a storage battery required active power and storage battery required reactive power to the storage battery unit 2 so as to control the output distribution of the active power and the reactive power.

The total active power and the total reactive power herein respectively mean active power and reactive power required in the whole wind power plant to maintain the frequency and the voltage of the power grid 7 within the acceptable range. The total active power and the total reactive power are respectively distributed to the wind turbine generator 1 and the storage battery unit 2 according to the prescribed output distribution.

The wind turbine required active power and the wind turbine reactive power respectively are the active power and the reactive power required by the wind turbine generator 1 out of the total active power and the total reactive power.

The storage battery required active power and the storage battery reactive power respectively are the active power and the reactive power required by the storage battery unit 2 out of the total active power and the total reactive power.

Specifically, the master controller 30 includes power calculation unit 34 and an operation mode switching unit 35 and the voltage information and the current information of the grid terminal 6 are inputted to the master controller 30.

The power calculation unit 34 calculates the total active power and the total reactive power to be supplied to the power grid 7 based on the voltage information and the current information having been inputted therein. For instance, in the power calculation unit 34, a phase locked loop (PLL) 31 detects a frequency from the voltage information of the grid terminal 6, and then a frequency-active power converter circuit 32 obtains the total active power based on the frequency. The frequency-active power converter circuit 32 may store a map of the active power corresponding to the frequency and calculate the total active power from the frequency based on the map. The voltage information refers to voltage fluctuation with time, i.e. information including voltage waveform. The current information refers to current fluctuation with time, i.e. information including current waveform.

Meanwhile, the power calculation unit 34 obtains reactive current from the voltage information having been inputted in a voltage-reactive current converter circuit 33 and calculates the total reactive power required in the grid with the voltage information.

The operation mode switching unit 35 switches an operation mode of the wind power plant between a first operation mode and a second operation mode by changing the output distribution of the active power and the reactive power respectively distributed to the wind turbine generator 1 and the storage battery unit 2.

In the first operation mode, the operation mode switching unit 35 performs the control such that wind turbine required active power and wind turbine required reactive power which match an upper limit that can be outputted by the wind turbine generator are outputted to the wind turbine generator 1 within the range of the total active power and the total reactive power respectively. Specifically, the operation mode switching unit 35 generates an active power command which is a control signal for outputting the wind turbine required active power to the wind turbine generator and an reactive power command which is a control signal for outing the wind turbine required reactive power, and then send the active power command and the reactive power command to the wind turbine generator controller 10.

Further, in the first operation mode, the operation control mode 35 outputs storage battery required active power and storage battery required reactive power to the storage battery unit 2. The storage battery required active power and the storage battery required reactive power respectively correspond to the difference between the total active power and the wind turbine required active power and the difference between the total reactive power and the wind turbine required reactive power. Specifically, the operation mode switching unit 35 generates the active power command which is the control signal for outputting the storage battery required active power and the reactive power command which is the control signal for outputting the storage battery required power, and then send the active power command the reactive power command to the storage battery controller 20.

The first operation mode is set principally when the power grid 7 is in the steady state. The steady state herein refers to the state in which a setting apparent power based on the storage battery required active power and the storage battery required reactive power in the output distribution between the wind turbine generator and the storage battery unit in the first operation mode does not exceed the setting apparent power of the storage battery unit, that is the state in which the voltage fluctuation in the grid or the frequency fluctuation is smaller than those during the grid disturbance.

Furthermore, the operation mode switching unit 35 switches the operation mode from the first operation mode to the second operation mode in such a case that apparent power based on the storage battery required active power and the storage battery required reactive power exceeds a setting apparent power of the storage battery unit 2 in the first operation mode In the second operation mode, the operation mode switching unit 35 performs the control such that the storage battery required active power is maintained and the storage battery required reactive power is reduced while the wind turbine reactive power is increased by an amount of the reduction of the storage battery required reactive power. The operation mode switching unit 35 generates an active power command which is a control signal for outputting to the storage battery unit 2 the storage battery required active power which is the same as the first operation mode, and a reactive power command which is a control signal for outputting the storage battery required reactive power reduced in the first operation mode, and sends the active power command and the reactive power command to the storage battery controller 20 so as to perform the above control. Furthermore, the operation mode switching unit 35 generates an active power command which is a control signal for outputting the wind turbine required active power which is the same as the first operation mode and a reactive power command which is a control signal for outputting the wind turbine required reactive power increased by an amount of the reduction of the storage battery required reactive power, and send the active power command and the reactive power command to the storage battery controller 20 so as to perform the above control.

The second operation mode described above is principally set in time of the grid disturbance by switching the operation mode from the first operation mode.

It is also preferable that the operation mode is switched from the first operation mode to the second operation mode when required apparent power derived from the output of the storage battery unit exceeds the setting apparent power of the storage battery unit which is set in advance. In this case, the storage battery required reactive power is reduced till the required apparent power derived from the storage battery required active power and the storage battery required reactive power becomes not greater than the setting apparent power.

Figure 3:
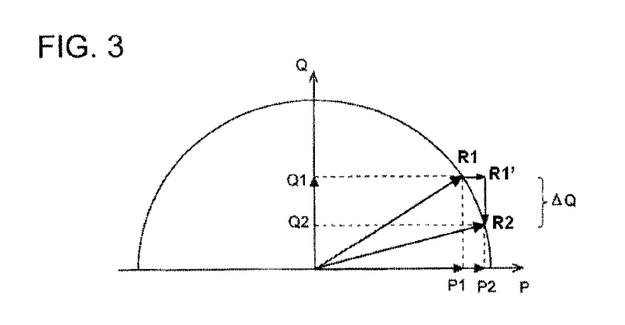
FIG. 3 A graph showing a power curve of setting apparent power of a storage battery unit.

In reference to FIG. 3, switching of the operation mode from the first operation mode to the second operation mode as well as the output command in the second operation mode is described. FIG. 3 is a graph showing a power curve of setting apparent power of a storage battery unit 2 of the preferred embodiment. FIG. 3 shows the storage battery required active power P, the storage battery required reactive power Q and the setting apparent power curve indicated with a semi-circular curve. In reference to the drawing, the storage battery unit 2 is in a state within an operatable range in such a case that an operation point of the storage battery unit 2 is inside of the setting apparent power curve and the storage battery is in a overload state in such a case that the operation point of the storage battery unit 2 is outside of the setting apparent power curve.

The case in which the operation point of the storage battery unit 2 in the first operation mode is R1 (P1, Q1) is described here. R1 is on the setting apparent power curve which is determined based on the performance and the amount of charge of the storage battery 2. This indicates that the storage battery unit 2 is operating within the load.

In this case, when the grid frequency decreases or the output of the wind turbine generator decreases in a frequency control operation state, the storage battery required active power becomes P2 and the operation point moves to R1' (P2, Q1). At the operation point R1', the required apparent power derived from the storage battery required active power P2 and the storage battery required reactive power Q1 exceeds the setting apparent power. That is, the operation point R1' is outside of the setting apparent power curve and the storage battery 2 is in the overload state.

Then, the operation mode is switched to the second operation mode so as to automatically move the operation point to another operation point R2 (P2, Q2) whose storage battery required reactive power is reduced to Q2 while maintaining the storage battery required active power P2 of the operation point R1' to avoid the storage battery unit 2 being in the overload state. Further, the amount of reduction ΔQ (=Q1−Q2) is a difference between the storage battery required reactive power before being reduced and the storage battery required reactive power after being reduced. The amount of reduction ΔQ is sent to the operation mode switching unit 35 of the master controller 30. The operation mode switching unit 35 sends to the wind turbine generator controller 10 the reactive power command in which the wind power required reactive power of the wind turbine generator 1 is increased by the reduction amount ΔQ of the storage battery required reactive power.

In the preferred embodiment, the first operation mode is applied principally in the steady state. In the first operation mode, the wind turbine required active power and the wind turbine required reactive power which are distributed to the wind turbine generator are set to maximum so as to match the upper limit which can be outputted by the wind turbine generator and thus, wind power energy which is renewable energy can be utilized effectively.

Meanwhile, the second operation mode is applied principally in the grid disturbance. Even if the total active power and the total reactive power change significantly during the grid disturbance, the storage battery unit 2 can be protected against overload. Further, the storage battery unit 2 which is capable of adjusting the active power freely outputs the active power preferentially and the wind turbine generator 1 which is not capable of adjusting the active power but capable of adjusting the reactive power outputs the reactive power preferentially. Thus, the required apparent power which is required to prevent the disturbance can be outputted in an appropriate distribution amount. The change in response to the small disturbance which does not render the storage battery 2 in the overload state, can be controlled in the first operation mode.

As described above, according to the preferred embodiment, it is possible to effectively utilize the renewable energy to maximum and control the optimum output distribution between the active power and the reactive power to prevent the storage battery 2 from getting in the overload state.

Further, the required apparent power is derived from the storage battery required active power and the storage battery required reactive power distributed to the storage battery unit 2 and in such a case that the require apparent power exceeds the setting apparent power, it is determined that the storage battery unit 2 exceeds the setting capacity. By this, it is possible to easily determine that the storage battery unit 2 exceeds its capacity from the storage battery required active power and the storage battery required reactive power.

As illustrated in FIG. 1, the storage battery unit 2 in the preferred embodiment may include a state of charge 25 which detects a residual amount. A structure of the state of charge 25 is not limited but may be structured such as to detect the residual amount based on discharge-charge current in an output line (discharge-charge line) of the storage battery 21. The residual amount of the storage battery 2 detected by the state of charge 25 is inputted to the master controller 30. It is preferable to change the setting apparent power in the master controller 30 in accordance with the residual amount of the storage battery 2 detected by the state of charge 25.

By this, not only during the grid disturbance, the active power and the reactive power can be distributed to the storage battery unit 2 and the wind turbine generator 1 respectively according to the residual amount of the storage battery unit 2 in the second operation mode.

Moreover, in the second operation mode the operation mode switching unit 35 monitors the required apparent power of the storage battery 2 in the output distribution between the wind turbine generator 1 and the storage battery 2 in the first operation mode, and switches the operation mode from the second operation mode to the first operation mode when the required apparent power becomes less than the setting apparent power. Specifically, during the operation in the second operation mode, the required apparent power in the output distribution of the second operation mode is monitored and when the required apparent power becomes less than the setting apparent power, i.e. when the storage battery unit 2 is no longer in the overload state in the first operation mode, the operation mode is switched from the second operation mode to the first operation mode. By this, it is possible to always operate in the first operation mode as long as the storage battery unit 2 does not become in the overload state and thus, wind power energy can be utilized to maximum.

Figure 4:
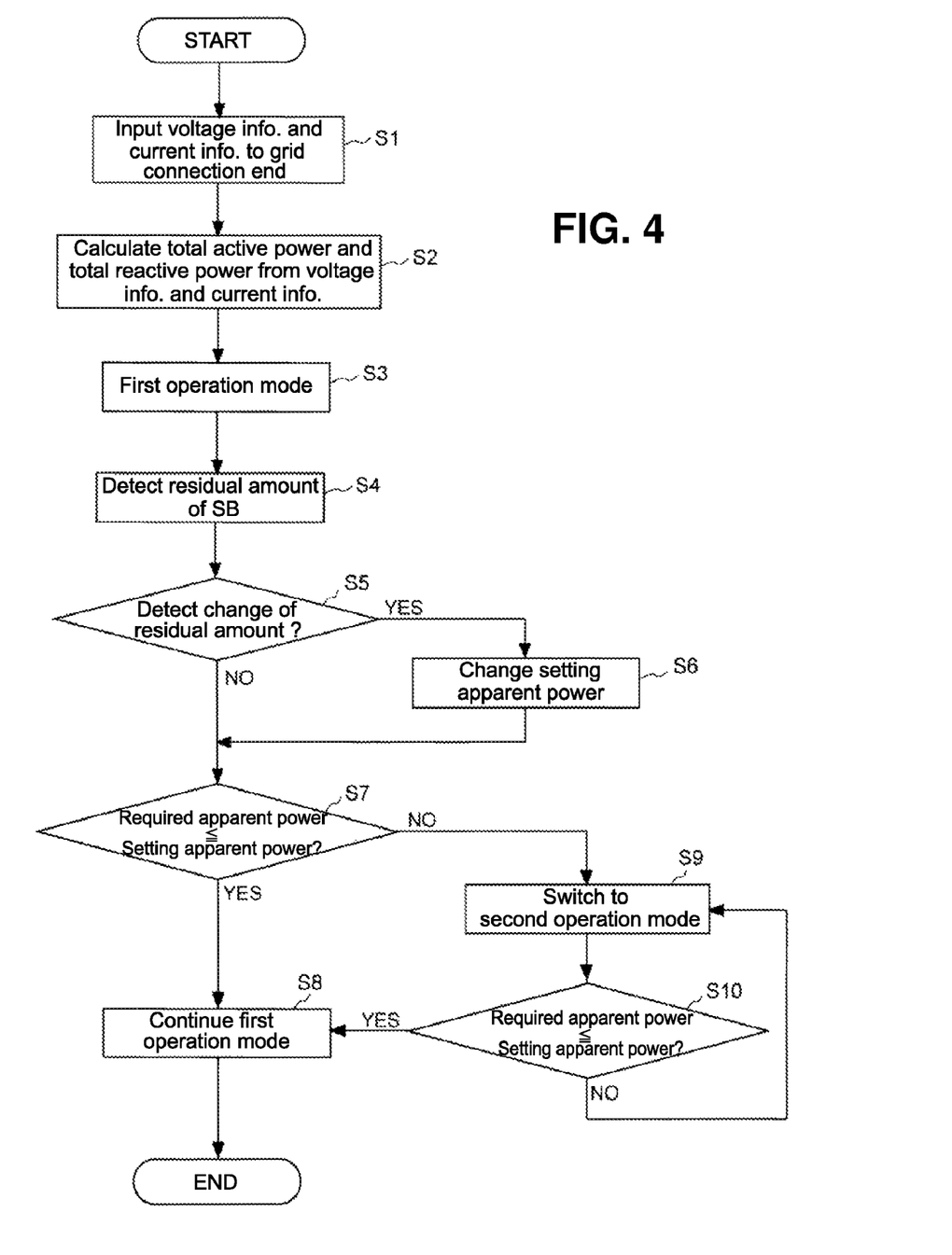
FIG. 4 A flow chart showing an output control method for the wind power plant of the preferred embodiment of the present invention.

The output control method of the wind power plant in relation to the preferred embodiment is explained in reference to FIG. 4. FIG. 4 is a flow chart showing an output control method for the wind power plant of the preferred embodiment of the present invention. The reference numbers described below correspond to those shown in FIG. 1 and FIG. 2.

The voltage information and the current information of the grid terminal 6 is inputted to the master controller 30 (S1). As already explained in FIG. 2, the master controller 30 calculates the total active power and the total reactive power required in the power grid 7 based on the voltage information and the current information of the grid terminal 6 (S2).

When the power grid 7 is principally in the steady state, the operation mode switching unit 35 of the master controller 30 performs the output distribution control to the wind turbine generator 1 and the storage battery 2 in the first operation mode (S3). Specifically, in the first operation mode, within the range of the total active power and the total reactive power calculated in the power calculation unit 34, sent to the wind turbine generator controller 10 is the command for outputting to the wind turbine generator 1 the wind turbine required active power and the wind turbine required reactive power which match the upper limit that can be outputted by the wind turbine generator 1, and sent to the storage battery controller 20 is the command for outputting to the storage battery unit 2 the storage battery required active power and the storage battery required reactive power which respectively match the difference between the total active power and the wind turbine required active power and the difference between the total reactive power and the wind turbine required reactive power. The wind turbine generator controller 10 performs the output control of the wind turbine generator 1 in accordance with the command of the wind turbine required active power and the command of the wind turbine required reactive power which are sent from the master controller 30. In the similar manner, the storage battery controller 20 performs the output control of the storage battery in accordance with the command of the storage battery required active power and the command of the storage battery required reactive power which are sent from the master controller 30.

The state of charge 25 detects the residual amount of the storage battery 21 (S4). Next, it is determined whether or not the residual amount of the storage battery 21 has changed since the last detection (S5). In such a case that it is determined that the residual amount of the storage battery 21 has changed, the setting apparent power is changed to such a value as to correspond to the residual amount (S6). The setting apparent power is as described herein above. In such a case that the 4 residual amount of the storage battery 21 has not changed, the setting apparent power remains the same.

Next, the operation mode switching unit 35 compares the required apparent power distributed to the storage battery unit 2 in the first operation mode and the setting apparent power (S7). In such a case that the required apparent power is within the setting apparent power, the output control in the first operation mode continues (S8). In contrast, in such a case that the required apparent power exceeds the setting apparent power, for instance, due to the grid disturbance, the operation mode is switched from the first operation mode to the second operation mode so as to control the output distribution between the wind turbine generator 1 and the storage battery 2 in the second operation mode (S9). In the second operation mode, the storage battery required active power of the storage battery 2 is maintained and the storage battery required reactive power is reduced while the wind turbine reactive power is increased by an amount of the reduction of the storage battery required reactive power. The wind turbine generator controller 10 controls the output of the wind turbine generator 1 in accordance with the command of the wind turbine required active power and the command of the wind turbine required reactive power which are sent from the master controller 30. In the similar manner, the storage battery controller 20 performs the output control of the storage battery in accordance with the command of the storage battery required active power and the command of the storage battery required reactive power which are sent from the master controller 30.

Moreover, during the operation in the second operation mode, the required apparent power in the output distribution of the second operation mode is monitored and the required apparent power and the setting apparent power is compared (S10), and when the required apparent power becomes less than the setting apparent power, i.e. when the storage battery unit 2 would not be in the overload state in the first operation mode, the operation mode is switched from the second operation mode to the first operation mode (S8). The operation in the second operation mode continues as until the required apparent power becomes less than the setting apparent power (S9).

According to the preferred embodiment as described above, the operation mode is selectively switched between the first operation mode which is set principally in the steady state of the grid and the second operation mode which is set principally in the grid disturbance. Thus, it is possible to effectively utilize the renewable energy to maximum and control the optimum output distribution of the active power and the reactive power to prevent the storage battery unit 2 from getting in the overload state.

The invention claimed is:

1. An output control method for a wind power plant in which a wind turbine generator and a storage battery unit are connected to a grid in parallel via a grid interconnection part, the method comprising the steps of:

calculating total active power and total reactive power to be supplied to the grid from the wind power plant based on voltage information and current information which are detected at a grid connecting end of the wind power plant, and switching an operation mode selectively between:

a first operation mode in which the wind turbine generator outputs wind turbine required active power and wind turbine required reactive power which match an upper limit that is outputted by the wind turbine generator and the storage battery unit outputs storage battery required active power and storage battery required reactive power which, respectively, correspond to a difference between the total active power and the wind turbine required active power and a difference between the total reactive power and the wind turbine required reactive power, respectively, within an allowable range of the total active power and the total reactive power; and a second operation mode in which the storage battery required active power is maintained and the storage battery required reactive power is reduced while the wind turbine reactive power is increased by an amount of the reduction of the storage battery required reactive power in such a case that apparent power based on the storage battery required active power and the storage battery required reactive power exceeds a setting apparent power of the storage battery unit in the first operation mode.

2. The output control method for the wind power plant according to claim 1,
wherein the operation mode is switched from the first operation mode to the second operation mode when required apparent power derived from output of the storage battery unit exceeds the setting apparent power of the storage battery unit which is set in advance,
wherein, in the second operation mode, the storage battery required reactive power is reduced till required apparent power derived from the storage battery required active power and the storage battery required reactive power becomes not greater than the setting apparent power.

3. The output control method for the wind power plant according to claim 1,
wherein a residual amount of power in the storage battery unit is detected and the setting apparent power is changed in accordance with the residual amount.

4. The output control method for the wind power plant according to claim 1,
wherein, in the second operation mode, a required apparent power of the storage battery unit in an output distribution between the wind turbine generator and the storage battery unit in the first operation mode is monitored, and the operation mode is switched from the second operation mode to the first operation mode in such a case that the required apparent power becomes less than the setting apparent power.

5. An output control unit for a wind power plant in which a wind turbine generator and a storage battery unit are connected to a grid in parallel via a grid interconnection part, the output control unit comprising:
a master controller to which voltage information and current information of a grid connecting end of the wind turbine generator are inputted;
a wind turbine generator controller which controls an output of the wind turbine generator based on an output command from the master controller; and
a storage battery controller which controls an output of the storage battery unit based on the output command from the master controller,
wherein the master controller includes a power calculation device which calculates total active power and total reactive power to be supplied to the grid from the wind turbine generator based on the voltage information and the current information, and an operation mode switching device configured to selectively switch an operation mode between:
a first operation mode in which the wind turbine generator outputs wind turbine required active power and wind turbine required reactive power which match an upper limit that is outputted by the wind turbine generator and the storage battery unit outputs storage battery required active power and storage battery required reactive power which respectively correspond to a difference between the total active power and the wind turbine required active power and a difference between the total reactive power and the wind turbine required reactive power respectively within an allowable range of the total active power and the total reactive power; and
a second operation mode in which the storage battery required active power is maintained and the storage battery required reactive power is reduced while the wind turbine reactive power is increased by an amount of the reduction of the storage battery required reactive power in such a case that apparent power based on the storage battery required active power and the storage battery required reactive power exceeds a setting apparent power of the storage battery unit in the first operation mode.

6. The output control unit for the wind power plant according to claim 5, further comprising:
a state of charge which detects a residual amount of the storage battery unit,
wherein the master controller changes the setting apparent power in accordance with the residual amount detected by the state of charge.

* * * * *